UNITED STATES PATENT OFFICE.

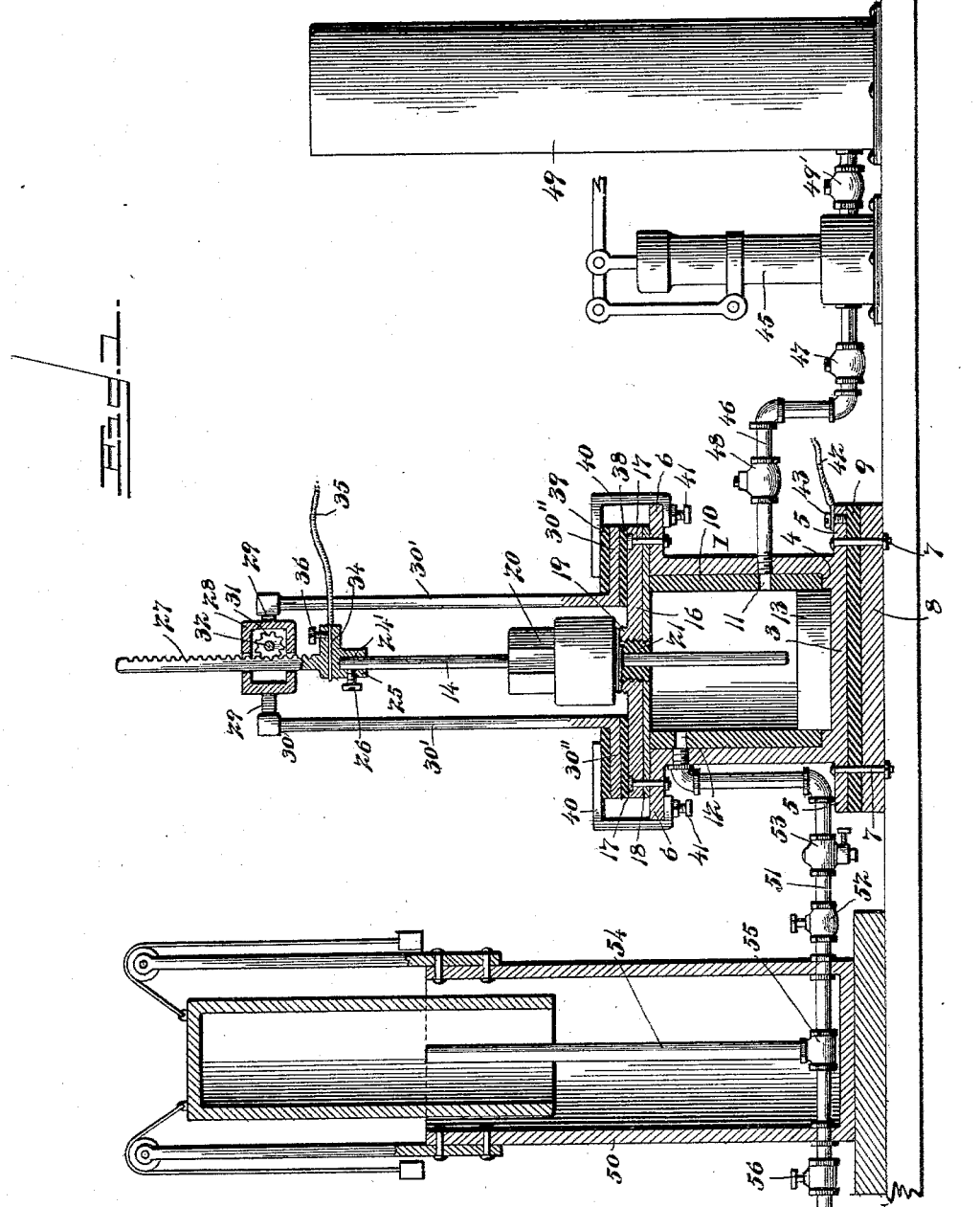

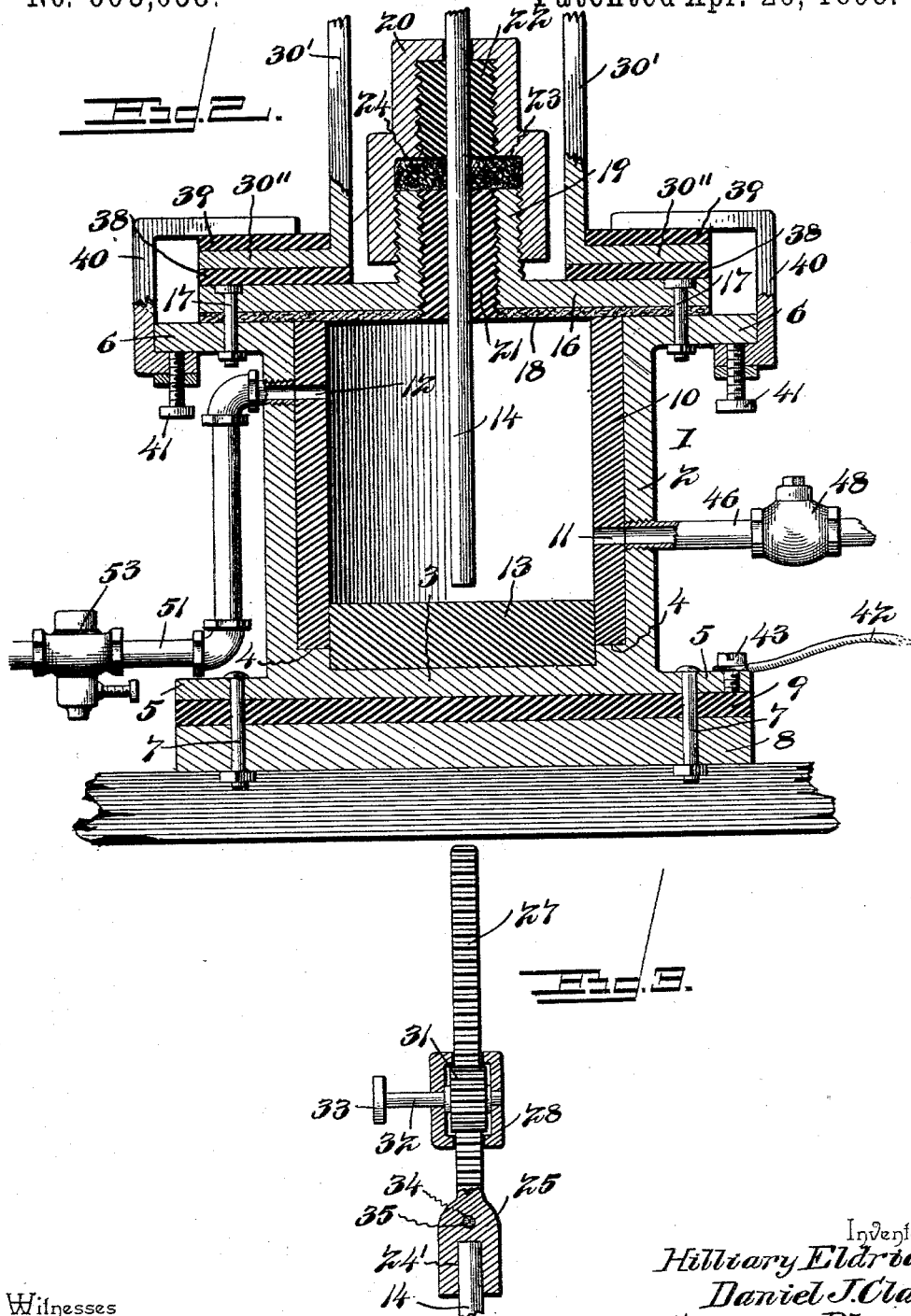

HILLIARY ELDRIDGE, DANIEL JOHNSON CLARK, AND SYLVAIN BLUM, OF GALVESTON, TEXAS.

ELECTRICAL RETORT.

SPECIFICATION forming part of Letters Patent No. 603,058, dated April 26, 1898.

Application filed June 28, 1897. Serial No. 642,701. (No model.)

*To all whom it may concern:*

Be it known that we, HILLIARY ELDRIDGE, DANIEL JOHNSON CLARK, and SYLVAIN BLUM, citizens of the United States, residing at Galveston, in the county of Galveston and State of Texas, have invented a new and useful Electrical Retort, of which the following is a specification.

Our invention relates to electrical retorts for manufacturing hydrogen gas from water to be utilized as a fuel for heating purposes. We construct the apparatus with electric appliances and with means for feeding water thereto, so as to produce an electric arc within a closed vessel containing a suitable quantity of water. The heat evolved by the electric arc and the electrolytic action of the electric current on the water operate to decompose the water into its component elements, hydrogen and oxygen. The gas thus produced is conducted to a suitable gasometer containing a water-bath. The oxygen, freed by the decomposition of the water in the retort, unites or combines with the vaporized carbon evolved by the consumption of the anodes and cathodes of the retort and produces carbonic-acid gas, the major portion of which is "washed out" or absorbed by the water within the gasometer, to which the gas from the retort is conveyed.

The object of our invention is to provide a portable plant for manufacturing hydrogen gas in which the elements of the plant are simple in construction, easily operated and controlled, and assembled together in a manner to secure tight joints at all points to prevent the leakage and escape of the gas.

To the accomplishment of these ends our invention consists in the novel combination of devices and in the construction and arrangement of parts, which will be hereinafter fully described and claimed.

To enable others to understand our invention, we have illustrated a preferred embodiment thereof in the accompanying drawings, forming a part of this specification, and in which—

Figure 1 is a sectional elevation through a portable gas plant constructed in accordance with our invention. Fig. 2 is an enlarged sectional view through the retort; and Fig. 3 is a sectional view, on an enlarged scale, through the feed mechanism for the anode of the retort.

Like numerals of reference denote corresponding parts in all the figures of the drawings, referring to which—

The numeral 1 designates the retort in its entirety, which is constructed in a novel manner to itself constitute the cathode of the electric appliances, and this retort is also constructed to receive the movable anode of the electric appliances in a manner to prevent the leakage of the gas evolved by the decomposition of the water within the retort.

The body of the retort consists of a cast-iron vessel or shell 2, preferably cylindrical in form. The bottom 3 of the retort is closed by a head, which is shaped to constitute an interior seat 4, and this cylindrical retort-shell has an annular flange 5 at its lower end and a similar flange 6 at its upper open end. The annular flange 5 at the base of the retort furnishes a means for receiving the bolts 7, which operate to fasten the retort to a tile foundation 8. On the foundation is placed the tile or tiles 9, upon which rests the base of the retort-shell 2, and through the base-flange 5 of the retort, the tile 9, and the foundation 8 pass the bolts 7, which serve to hold the retort solidly in place.

The interior of the retort-shell 2 is lined with a carbon lining 10 or other material refractory to heat. This carbon lining is of cylindrical form, and it rests snugly upon the interior seat 4 within the shell of the retort. The carbon lining 10 is pierced at one side, near its lower end, with an induction-port 11 for the water, and it is likewise provided with an eduction-port 12, the latter being situated at a point diametrically opposite to the water-induction port 11 and near the upper end of the retort.

The cathode or negative electrode 13 is in the form of a flat disk of carbon, which is fitted within the seat 4 of the retort, upon the bottom thereof. The cathode is shown as fitting snugly within the carbon lining 10 of the retort, and the parts 10 13 are thus fitted snugly together to be held from displacement within the retort.

The anode or positive electrode 14 passes through an insulated stuffing-box on the cover of the retort, and this stuffing-box is constructed in a novel manner to insulate the anode from the retort and to produce a tight joint to obviate leakage of the gas which may be generated in the retort.

The anode consists of a rod or pencil of carbon, and it is connected at its upper part to a carrier or holder 25, which is controlled by a suitable feed mechanism to adjust the anode within the retort as may be required. The supporting and adjusting devices for the anode will be presently described in detail.

The upper open end of the retort-shell 2 is designed to be closed by a cast-metal cover or head 16, which is fastened tightly upon the retort-shell by the through-bolts 17. To secure a tight joint between the retort-shell and its closure, we provide an asbestos packing 18 between the flange 6 and the head 16, said packing being clamped between said flange and the cover or head 16 when the bolts are tightened. The cover or head 16 of the retort carries a stuffing-box, through which the anode 14 enters the retort. This stuffing-box consists of a nipple 19 and the gland 20. The nipple 19 is formed integrally within the closure 16, and it extends upwardly therefrom at the center thereof. The nipple is screw-threaded interiorly to receive and hold the insulating-bushing 21, which is screwed into the nipple, and said nipple is also screw-threaded externally to adapt it to receive the gland 20. This gland is a casting having upper and lower parts of different diameters joined together by an integral shoulder, and the lower part of the gland 20 is threaded internally to enable said gland to be screwed upon the externally-threaded nipple of the stuffing-box. The upper smaller end of the gland 20 is screw-threaded internally to receive the threaded block of insulating material 22, which constitutes the upper bushing for the movable anode 14, said upper bushing 22 being held or fastened securely in the upper part of the gland 20 by reason of the screw-threaded connection of the bushing with the gland. It will be observed that we have provided two insulating-bushings 21 22 for the anode, one of which bushings is fastened within the nipple and the other bushing is fastened within the gland of the stuffing-box.

The insulating-bushings 21 22 within the stuffing-box are made either of asbestos, mica, or a substance known as "phonolite" to form an electric insulator, which is also refractory to heat.

The insulating-bushings 21 22 are spaced apart vertically within the stuffing-box, and the gland 20 is arranged to be screwed on the nipple 19, so as to provide a space or chamber above the nipple and within the gland, which space or chamber is designated by the numeral 23. Within this chamber, in the gland of the stuffing-box, is placed a packing 24, of asbestos or other appropriate material, and this packing encompasses the anode 14, whereby the stuffing-box provides a tight joint against the leakage of gas from the retort, and it also serves to sustain the bushings that operate to electrically insulate the anode from the metallic vessel or shell of the retort. The stuffing-box packing 24 may consist of asbestos, as described, or we may use asbestos wool or asbestos rope or asbestos fiber mixed with a little fire-clay, which admixture makes the stuffing-box packing refractory to heat. The bushings 21 22 are pierced with vertical apertures, and said bushings are held within the members of the stuffing-box to bring the vertical apertures in the respective bushings in alinement with each other, whereby the anode 14 may readily pass through and have the desired vertical play within the bushings 21 22.

The upper extremity of the carbon anode 14 is fitted in a socket 24, provided in the lower side of the carrier or holder 25, said anode being made fast to the carrier by the employment of a clamping-screw 26. This carrier 25 has a rack-formed guide-rod 27, attached thereto or made an integral part thereof, and this guide-rod passes vertically through a suitable aperture in a boxing or casing 28. Said boxing or casing is supported by the cross-arm 29 of a supporting-frame 30, which is erected upon the closure or head of the retort. Within the guide box or casing 28 is arranged an adjusting gear or pinion 31, which is carried by a shaft 32, that is journaled in said box or casing 28. This gear-pinion 31 meshes with the rack formed on one edge of the guide-rod 27 of the carbon-carrier 25, and the shaft 32 of said gear-pinion has an insulated hand-wheel 33, by which the shaft and pinion may be rotated to adjust the carrier 25 and the anode 14 vertically, as may be required. The carrier or holder 25 is provided with a transverse hole or socket 34, in which is fitted the end of one of the electric conductors 35, and this conductor is made fast to the carrier or holder 25 by a binding-screw 36, which works in a threaded aperture in the carrier 25 and impinges upon the conductor 35, as shown more clearly by Fig. 3.

The upright standards or legs 30' of the supporting-frame 30 terminate at their lower ends in the feet 30", which rest upon the cover or closure 16 of the retort. The frame 30 is clamped to, but insulated from, said closure of the retort in the following manner: Between the feet 30" of the standards and the metallic closure 16 are interposed layers or strips of insulating material 38, and upon the upper sides of the feet 30" are placed other layers or strips of insulating material 39. The clamps 40 40 are arranged to embrace the feet of the supporting-frame 30 and the flange 6 of the retort, and said clamps are provided with binding-screws 41, which operate against the flange 6 of the retort to draw the clamps tightly upon the feet 30" of the standards. It will thus be seen that the supporting-frame 30 is firmly but detachably held upon the closure 16 by the action of the clamps 40, and at the same time the supporting-frame is insulated from the cover 16 and from the clamps 40, the latter being in electrical connection with the metallic shell or body 2 of the retort. The other conductor 42 of an electric circuit is attached directly to the integral base-flange 5 of the retort-shell 2, and said conductor 42 is held in place by means of the binding-screw 43, whereby the conductor is connected in good metallic contact with the metallic shell 2 of the retort. The current from the conductor 35 passes through the carrier 25 to the anode 14, thence to the cathode 13, and thence through the metallic retort-shell and its base-flange 5 to the conductor 42, thereby completing the circuit back to the generating-machine, battery, or other source of electric energy. Water is forced into the retort 1 by a pump 45 of any suitable construction. This pump 45 is mechanically connected with the retort by a pipe 46, one end of which is screw-threaded into the wall of the metallic shell 2 opposite to the water-induction port 11. This connection of the pipe 46 to the retort-shell provides a tight joint between the parts to prevent the escape of gas from the retort, and the port 11 in the refractory lining 10 provides for the convenient inlet of the water to the interior of the retort. The pipe connection 46 between the retort and the pump has a suitable stop-cock 47, and it is also equipped with a check-valve 48, which responds only to the stroke of the pump, and thus overcomes any back pressure of the gas or liquid from the retort. Water is supplied to the pump 45 from a suitable tank 49, having a valved connection 49' with the pump, as shown by Fig. 1.

The gas generated within the retort is conducted to a suitable gas-holder or gasometer 50, which may be of any preferred construction. The gas is conducted from the retort to the gasometer by a pipe connection 51, one end of which is threaded into the metallic shell 2 of the retort opposite to the gas-eduction port 12 in the refractory lining 10 of the retort, thus making a tight joint between the outlet-pipe and the retort. The other end of the pipe connection 51 is attached to the lower part of the water-tank of the gasometer, and said pipe 51 is provided with a stop-cock 52 and with a petcock 53, both of which may be of any preferred construction. The stop-cock 52 may be closed when the gasometer has been charged with gas, and the petcock 53 may be opened when it is desired to discharge any surplus gas generated within the retort after the gasometer shall have been filled. This gasometer is constructed with a water-tank and with a vertically-movable bell, as usual, and the gas delivered by the pipe connection with the retort is discharged into the gasometer by a vertical pipe 54. The gas contained in the gasometer may be conducted to any suitable burner for consumption thereby through a connection 55 at the lower end of the gasometer, said connection having a suitable regulating-cock 56. The connection between cock 56 and the pipe that leads the gas to the consuming-burner should be of non-conducting material.

This being the construction of our gas-making apparatus or plant, the operation may be described, briefly, as follows: The electric current is admitted through the conductor 35 and the anode 14, thence across the arc to the cathode 13, which is in electrical connection with the metallic retort-shell 2 and the other conductor 42. Before the current is admitted the anode is lowered to have its lower extremity rest upon and make contact with the cathode 13 by adjusting the gear-pinion that engages with the rack on the carrier 25, and this pinion is then reversed to raise the anode a suitable distance, the current thus establishing an arc between the elements 14 13 of the electrical appliances. The pump is now operated to inject water into the retort-chamber. The water is dissolved into its component elements, hydrogen and oxygen, by the heat evolved by the arc and by the electrolytic action of the electric current, and the oxygen, freed by decomposition of the water, unites or combines with the vaporized carbon evolved by the consumption of the anode and cathode, thus producing carbonic-acid gas. The gas generated within the retort is conveyed by the pipe 51 to the gasometer 50, and the major portion of the carbonic-acid gas is absorbed by the water-bath in said gasometer.

We are aware that changes in the form and proportion of parts and in the details of construction, herein shown and described as the preferred embodiment of our invention, may be made by a skilled mechanic without departing from the spirit or sacrificing the advantages of our invention. We therefore reserve the right to make such modifications and alterations as fairly fall within the scope of our invention.

If desired, we can connect the retort by pipe connections to the exhaust-pipe of a steam-engine should we deem it necessary to run a dynamo by means of a steam-engine. This arrangement and adaptation of mechanisms will enable us to utilize exhaust-steam from an engine in case we desire to operate a steam plant to generate electrical currents to be used to operate the retort.

Having thus fully described our invention, what we claim as new, and desire to secure by Letters Patent, is—

1. In a plant for manufacturing hydrogen gas by electrolysis, a retort having a closed chamber and a conducting-bottom, a base insulated electrically from said retort, a closure or head also insulated from the retort, a cathode seated in electrical contact with the conducting-bottom of said retort, and a packed insulating stuffing-box mounted on the head, in combination with an anode, electrical connections for the anode and cathode, and means for feeding water to the retort, substantially as described.

2. In a plant for manufacturing hydrogen gas by electrolysis, the retort having a conducting-bottom and closed chamber, a disk-like cathode seated on the conducting-bottom of the retort and in electrical contact therewith, an annular bottomless lining secured within the retort-chamber to surround the cathode and having the water-induction port and the gas-eduction port, a stuffing-box supported on the head or cover of the retort above the cathode and carrying the vertically-alined insulated bushings, an anode movable within said bushings of the stuffing-box and insulated thereby from electrical contact with said stuffing-box, a feed mechanism for the anode, and electrical conductors in contact with the retort and the anode, combined with a feed-pump connected with the water-induction port, a gasometer, and connections between the gasometer and the gas-eduction port from the retort and its refractory lining, substantially as and for the purposes described.

3. In a plant for manufacturing hydrogen gas by electrolysis, a retort comprising a metallic vessel having a head or cover, a two-part stuffing-box having one member rigid with said retort-head and the other member forming a removable gland, insulating-bushings fixed within the members of said stuffing-box and arranged in vertical alinement with each other, and a packing confined between the vertically-alined bushings, combined with an anode movable through the bushings and packing of the stuffing-box and insulated by said bushings from electrical contact with the stuffing-box, a cathode confined within the retort, and suitable electrical connections, substantially as and for the purposes described.

4. In a plant for manufacturing hydrogen gas by electrolysis, a retort having a head or cover, a stuffing-box having one member rigid with said head or cover and provided with an interior insulating-bushing, a stuffing-box gland coupled to the rigid stuffing-box member, another insulating-bushing secured within the stuffing-box gland and having a vertical opening in alinement with a similar opening in the rigid member of the stuffing-box, and a packing interposed between the insulating-bushings and confined by a gland within the stuffing-box, in combination with an anode movable through said alined bushings and insulated thereby from electrical contact with the stuffing-box, a cathode within the retort-chamber, and electrical connections, substantially as and for the purposes described.

5. In a plant for manufacturing hydrogen gas by electrolysis, a retort having a chamber and a cathode confined therein, a head or closure insulated from said retort, a two-part stuffing-box carried by said head or closure and containing vertically-alined insulating-bushings and a packing confined between said bushings, a supporting-frame insulated from the head or closure, and clamps for holding said closure on the supporting-frame rigidly upon the retort, combined with a feed mechanism mounted in the supporting-frame, an anode passing through the bushings of and insulated from electrical contact with a stuffing-box, and suitable electrical connections for the retort and said anode, substantially as and for the purposes described.

6. The combination with a retort vessel having a closure, and a cathode therein, of a supporting-frame resting upon, but insulated from, the retort-closure, a clamp embracing said retort vessel and the supporting-frame, but insulated from the latter, an anode, a carrier for said anode and provided with a guide-rack, a boxing supported on the frame, and a shaft carrying an adjusting-pinion, as and for the purposes described.

7. In a plant for manufacturing hydrogen gas by electrolysis, a retort having a tightly-closed chamber, and a two-part stuffing-box mounted on said retort and provided with insulating-bushings and a packing, combined with an anode movable through the stuffing-box and insulated by the bushings therein, a cathode within the retort, electrical connections for said cathode and anode, and means for feeding a liquid to said retort, substantially as described.

8. In an apparatus for manufacturing hydrogen gas by electrolysis, a retort having an insulated cover, an upright frame clamped to said retort and provided with a guide-head, and a stuffing-box mounted on the cover and having insulating-bushings in line with the guide-head, combined with an anode passing through the guide-head and stuffing-box, a feed mechanism for said anode, a cathode and electrical connections for said anode and cathode, substantially as described.

In testimony that we claim the foregoing as our own we have hereto affixed our signatures in the presence of two witnesses.

HILLIARY ELDRIDGE.
DANIEL JOHNSON CLARK.
SYLVAIN BLUM.

Witnesses:
  B. I. WILLCOXON,
  M. BURNS.